(12) United States Patent
Shaffer et al.

(10) Patent No.: US 8,619,642 B2
(45) Date of Patent: Dec. 31, 2013

(54) CONTROLLING A JITTER BUFFER

(75) Inventors: Shmuel Shaffer, Palo Alto, CA (US);
James C. Frauenthal, Colts Neck, NJ (US)

(73) Assignee: Cisco Technology, Inc., San Jose, CA (US)

( * ) Notice: Subject to any disclaimer, the term of this patent is extended or adjusted under 35 U.S.C. 154(b) by 723 days.

(21) Appl. No.: 11/691,756

(22) Filed: Mar. 27, 2007

(65) Prior Publication Data
US 2008/0240004 A1 Oct. 2, 2008

(51) Int. Cl.
*H04L 5/16* (2006.01)

(52) U.S. Cl.
USPC ........ 370/296; 370/230.1; 370/229; 370/276; 370/230

(58) Field of Classification Search
USPC ................ 370/230, 230.1, 296, 229, 276
See application file for complete search history.

(56) References Cited

U.S. PATENT DOCUMENTS

| | | | |
|---|---|---|---|
| 6,452,950 B1 | 9/2002 | Ohlsson et al. | |
| 6,683,889 B1 | 1/2004 | Shaffer et al. | |
| 7,359,324 B1 * | 4/2008 | Ouellette et al. | 370/230 |
| 2002/0101885 A1 * | 8/2002 | Pogrebinsky et al. | 370/516 |
| 2004/0066751 A1 * | 4/2004 | Tseng et al. | 370/252 |
| 2005/0227657 A1 * | 10/2005 | Frankkila et al. | 455/255 |
| 2007/0211704 A1 * | 9/2007 | Lin et al. | 370/356 |

* cited by examiner

*Primary Examiner* — Omer Mian
(74) *Attorney, Agent, or Firm* — Schwegman Lundberg & Woessner, P.A.

(57) ABSTRACT

A method and a network device for controlling a jitter buffer are disclosed. The method comprises providing a jitter buffer to counter the effect of jitter in a communication channel and comprises determining a duplex mode of the communication channel. The method further comprises adjusting parameters of the jitter buffer in response to determination of the duplex mode, half-duplex mode and full-duplex mode respectively having respective sets of parameters associated therewith. A network device comprises a jitter buffer to counter the effect of jitter in a communication channel and a controller operable to determine a duplex mode of the communication channel and to adjust parameters of the jitter buffer in response to determination of the duplex mode, half-duplex mode and full-duplex mode having respective sets of parameters associated therewith.

16 Claims, 4 Drawing Sheets

US 8,619,642 B2

CONTROLLING A JITTER BUFFER

FIELD

This application relates to telecommunications, for example in Push-To-Talk communication networks. In an example embodiment, a method, network device and system for controlling a jitter buffer is described.

BACKGROUND

When a media stream, for example a VoIP (Voice over Internet Protocol) stream, is transmitted across a packet network, the stream is broken up into a plurality of packets. The packets often end up at their destination asynchronously (e.g. out of sequence or delayed) because not all packets follow the same route.

A jitter buffer (also known as a de-jitter buffer) may be used to hold several packets which have arrived asynchronously, so they can be played out synchronously. The larger the buffer (i.e. the longer the delay introduced by the buffer), the bigger the period which asynchronous packets have to arrive to be played out synchronously. This is often referred to as the size of the jitter buffer.

There are two standard ways to implement a jitter buffer—static and dynamic. The amount of delay introduced by a static jitter buffer is fixed and implemented by the manufacturer or configured during system initialization. A dynamic jitter buffer may be an adaptive device that adjusts (within manufactured or configured bounds) to accommodate recent network delay conditions. A dynamic jitter buffer has a range bounded by a lower limit and an upper limit (typically dictated by the amount of storage space available) between which the jitter buffer is able to be adjusted. The jitter buffer may employ an algorithm to determine the instantaneous amount of delay to insert so that packets can be played out synchronously. The jitter buffer adjustment algorithm uses recent packet arrival statistics to trade-off the risk of not having a packet to play out (starvation) against the consequences of introducing unnecessary, excess delay.

The process of adapting the instantaneous amount of delay introduced by the jitter buffer (i.e. the buffer size) may cause discontinuities in the play-out media stream. To adjust to a longer delay, the jitter buffer must play out silence or must replay information to fill the void. To adjust to a shorter delay, the jitter buffer has to discard some or all of the information in one or more packets. These discontinuities are disruptive to the synchronous play-out stream and may be annoying to the listener. Whenever possible, adjustments to the instantaneous size of the jitter buffer are made by lengthening or shortening silent periods.

BRIEF DESCRIPTION OF DRAWINGS

Example embodiments are illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of example embodiments. It will be evident, however, to one skilled in the art that other embodiments may be practiced without these specific details.

Overview

In an example embodiment there is provided a method which comprises providing a jitter buffer to counter the effect of jitter in a communication channel and which comprises determining a duplex mode of the communication channel. The method further comprises adjusting parameters of the jitter buffer in response to determination of the duplex mode. A half-duplex mode may have a first set of parameters associated therewith and a full-duplex mode may have a second set of parameters associated therewith. An example embodiment further provides a network device which comprises a jitter buffer to counter the effect of jitter in a communication channel and a controller operable to determine a duplex mode of the communication channel and to adjust parameters of the jitter buffer accordingly. An example embodiment may also include a system which comprises at least one network device as above described.

Example Embodiments

Figure 1:
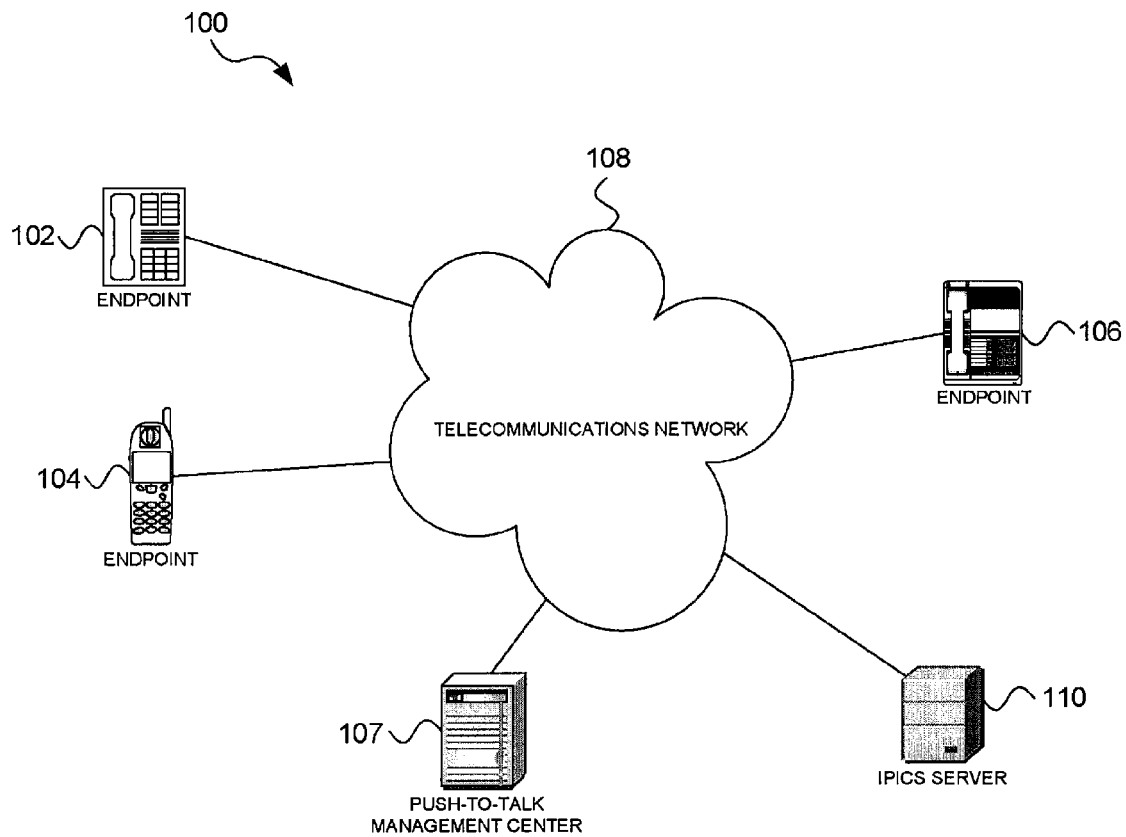
FIG. 1 shows a schematic view of a system, in accordance with an example embodiment, for controlling a jitter buffer.

FIG. 1 shows a system 100 for controlling a jitter buffer, in accordance with an example embodiment. Broadly, the system 100 may include a plurality of network devices. For instance, the network devices may be in the form of endpoint devices 102 to 106. The system 100 may also include an endpoint device in the form of one or more PMCs (Push-To-Talk Management Centers) 107. Although the jitter buffer may be operable to counter the effect of jitter for any media stream, example embodiments will be further described with reference to a media stream in the form of an audio stream, particularly for voice communication. Thus, the endpoint devices 102 to 107 may be telephony endpoint devices, for example VoIP telephones, Push-To-Talk (PTT) telephony devices, a computer with a CTI (Computer Telephony Interface), a mobile telephone, or the like. The endpoint devices 102 to 107 may be operatively networked together via a packet-based telecommunications network 108, which may be the Internet, LAN, WAS, satellite communications network, any other network for communicating media, or a combination of these networks.

The system 100 may further include a computer system operable to manage telecommunications sessions, the computer system for example being in the form of an IP Interoperability and Collaboration System (IPICS) server 110 which may be able to manage, co-ordinate and host virtual talk groups (VTGs), conference calls, or the like.

In accordance with an example embodiment, the endpoint devices 102 to 107 may be operable to communicate in half-duplex mode, full-duplex mode or both. It is to be understood that in half-duplex mode, a device can communicate in only one direction at a time, that is it can either transmit or receive, but it cannot do both at the same time. Conversely, in full-duplex mode, a device can communicate in both directions at the same time, that is, to transmit and receive simultaneously.

Figure 2:
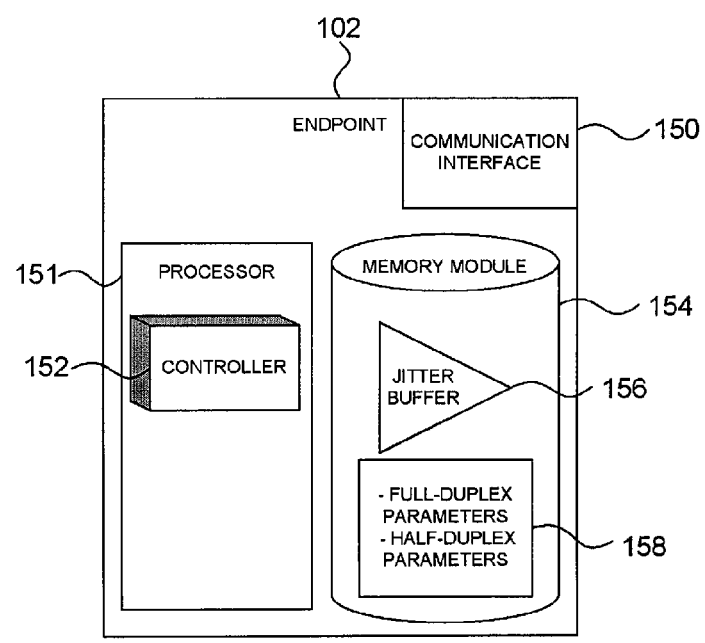
FIG. 2 shows a schematic view of a network device in the example embodiment of FIG. 1, for controlling a jitter buffer.

Referring now also to FIG. 2, the example endpoint device 102 is shown in more detail, including a plurality of functional components. It is to be appreciated that any of the other endpoint devices 104 to 107 may also include some or all of the functional components. The functional components are not necessarily consolidated into one device, as in this example, but may be distributed among a number of devices.

In particular, the endpoint device 102 includes a communication interface 150 which is operable to transmit and receive packets containing voice communication data across the telecommunications network 108. The endpoint device 102 further includes a processor 151 and a memory module 154. The processor 151 comprises a controller 152 which is a conceptual module corresponding to a task performed by the processor 151. To this end, the endpoint device 102 may include a machine-readable medium, main memory and/or a hard disk drive, which carries a set of instructions to direct the operation of the processor 151, for example being in the form of a computer program. It is to be understood that the processor 151 may be one or more microprocessors, controllers, Digital Signal Processor (DSP) or any other suitable computing device, resource, hardware, software, or embedded logic.

The memory module 154 includes a jitter buffer 156 and at least two sets of parameters 158, each set respectively associated with a half-duplex mode and a full-duplex mode. In this specification, a "set of parameters" may include only one parameter. In accordance with an example embodiment, the controller 152 is operable to adjust the size of the jitter buffer 156 in accordance with a duplex mode of the voice communication (described further by way of example below).

In general, full-duplex connections can accommodate less one-way delay than half-duplex connections, if they are to function satisfactorily as perceived by users. One reason for this is that delays in excess of about 150 ms may reduce the ability of a DSP, if present, to provide echo cancellation. In addition, a longer delay may cause unacceptable amounts of conversational collisions such as accidental interruption or talking-over other speakers. In PTT communications, for example, because only one user can transmit at a time and must hand over floor control before another can talk, longer delays may be tolerated. Thus, the size of the jitter buffer 156 for half-duplex mode can be larger, for example 300 ms, to increase the quality of voice communications.

Therefore, in accordance with an example embodiment, a parameter associated with half-duplex mode may include a larger jitter buffer size while a parameter associated with full-duplex mode may include a smaller jitter buffer size. Thus, the controller 152 may be able to adjust the size or mode of the jitter buffer 156 on-the-fly or in real time (e.g., instantaneously, or at least relatively quickly when a transition between modes occurs) by loading a new set of associated parameters 158. Thus, a first set of parameters may be associated with half-duplex mode and a second set of parameters may be associated with full-duplex mode. Accordingly, in an example embodiment during operation, a selected set of parameters in not merely fine tuned for operation of the jitter buffer 156 but a different set of parameters may be loaded. Thus, it is to be understood that the adjustment may be discontinuous, in other words, not a gradual adjustment. Thus, in an example embodiment, the jitter buffer 156 does not adapt in steps or increments equal to a frame-size of a voice encoding (e.g., 10 ms), but adapts discontinuously corresponding to duplex mode shifts that result in changes of more than one frame-size at a time. It is however to be appreciated that, in addition to changing parameters when going from half-duplex mode to full-duplex mode, parameters in a particular mode of operation may be adjusted or fine tuned. Accordingly, the first set of parameters may be adjusted or fine tuned when operating in the half-duplex mode and the second set of parameters may be fine tuned when operating in the full-duplex mode. In an example embodiment, a new set of parameters may be retrieved from memory and replace the existing set of parameters. The existing set of parameters may be stored in memory for future use.

For example, a jitter buffer size of 150 ms or more may be associated with half-duplex communications while a jitter buffer size of 150 ms or less may be associated with full-duplex communications.

The associated parameters 158 may include a single jitter buffer value or size respectively associated with each duplex mode, the jitter buffer 156 thus effectively being two differently sized static (or non-adaptive) jitter buffers for the respective duplex modes. For example, a jitter buffer size of 250 ms may be associated with half-duplex mode while a jitter buffer size of 100 ms may be associated with full-duplex mode.

Alternatively, the associated parameters 158 may include a range (having a lower bound and an upper bound) associated with each duplex mode, the jitter buffer 156 thus effectively being a dynamic jitter buffer. The ranges may be mutually exclusive. For example, a range for half-duplex mode may be between 250 ms and 300 ms and a range for full-duplex mode may be between 50 ms and 150 ms. Instead, the ranges may overlap, the lower bound for half-duplex mode thus being lower than the upper bound for full-duplex mode, for example a range for half-duplex mode being between 150 ms and 600 ms and a range for full-duplex mode being between 50 ms and 250 ms.

In addition, the jitter buffer 156 may be adaptive, for example using an adaptive algorithm to change the size of the jitter buffer 156 to any convenient value within its current range based on packet traffic statistics. Therefore, the controller 152 may be operable to adjust the size or mode of the jitter buffer 156 on-the-fly (e.g., instantaneously or at least relatively quickly) in accordance with the associated parameters 158, while an adaptive algorithm may be operable to adjust the size of the jitter buffer 156 more gradually within its defined range in response to actual packet traffic.

The parameters 158 associated with their respective duplex modes may be based on any convenient criteria, for example network topologies and user requirements. The parameters 158 may be adjusted based a normal adaptive changes in a current duplex mode and replaced when the current duplex mode changes.

Figure 3:
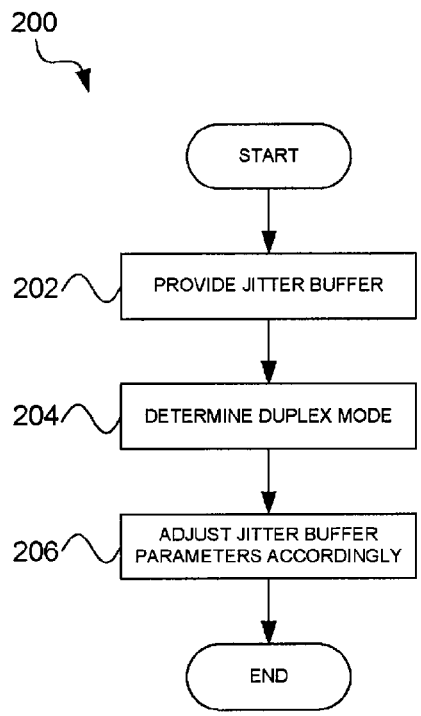
FIG. 3 shows a high-level flow diagram of a method, in accordance with an example embodiment, for controlling a jitter buffer.
Figure 4:
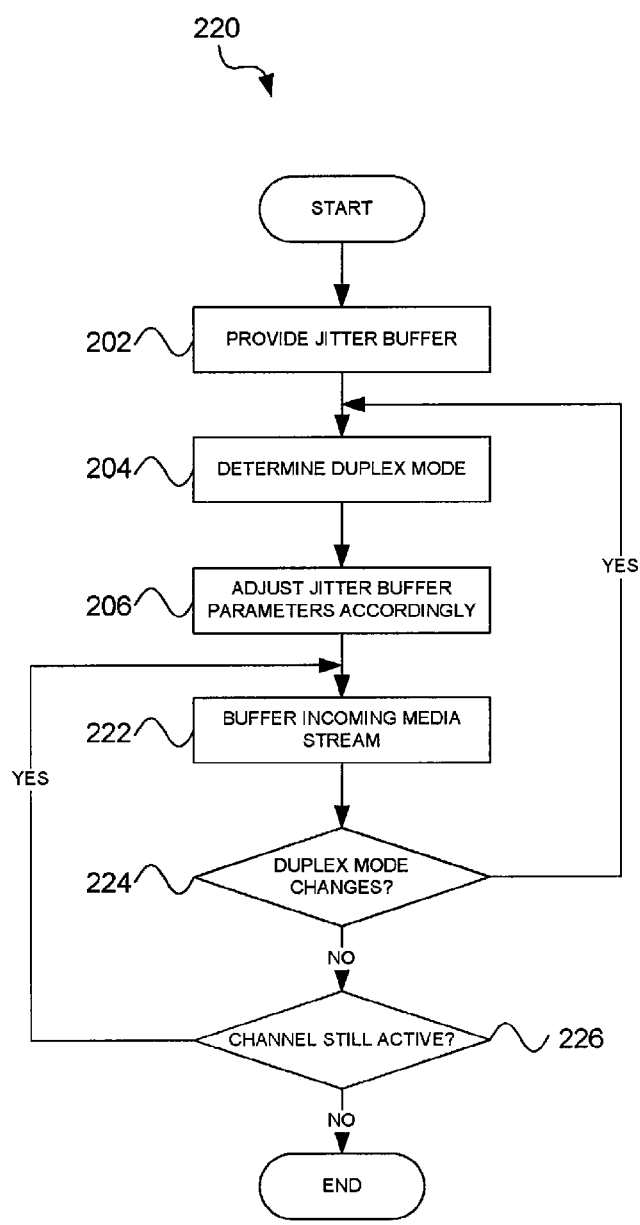
FIGS. 4 and 5 show low-level flow diagrams of methods, in accordance with example embodiments, for controlling a jitter buffer.
Figure 5:
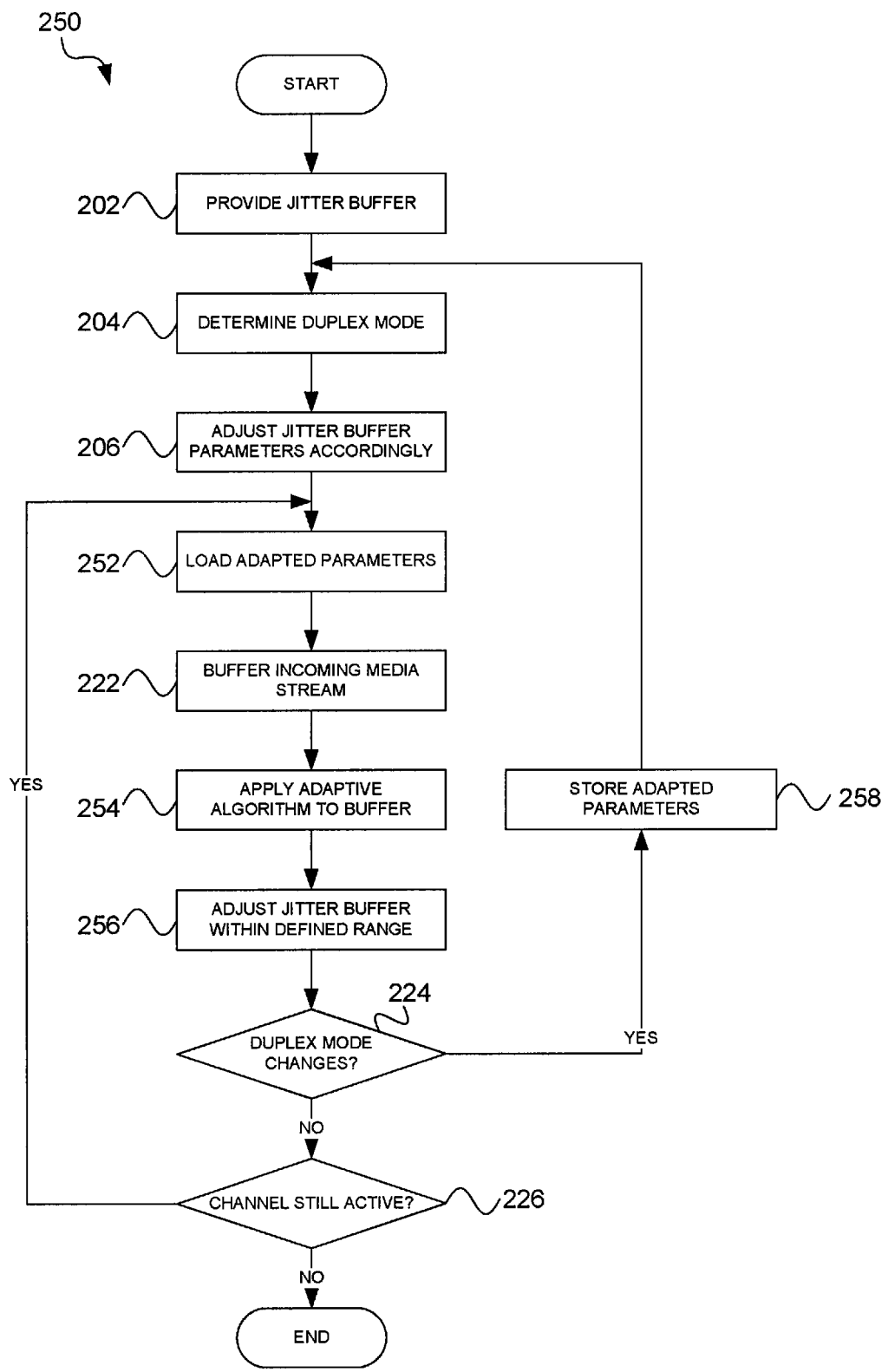

Example embodiments will now be further described in use with reference to FIGS. 3 to 5. The example methods shown in FIGS. 3 to 5 are described by way of example with reference to FIGS. 1 and 2, although it is to be appreciated that the example methods may be applicable to other systems as well.

FIG. 3 shows a high-level flow diagram of a method 200, in accordance with an example embodiment, for controlling a jitter buffer. The method 200 comprises providing, at block 202, a jitter buffer to counter the effect of jitter in a communication channel. The method 200 further comprises determining, at block 204, a duplex mode of a communication channel and adjusting, at block 206, parameters of the jitter buffer in accordance with the duplex mode, wherein half-duplex mode and full-duplex mode having respective sets of parameters associated therewith.

Referring now to FIG. 4, a low-level flow diagram of a method 220 in accordance with an example embodiment is shown. The method 220 may be utilized by a particular application for controlling static (or non-adaptive) jitter buffers. In FIG. 3 and FIG. 4, like numerals refer to similar or the same operations, unless otherwise indicated. Again, a jitter buffer 156 is provided, at block 202. The jitter buffer 156 may be implemented on one or more of the endpoint devices 102 to 107.

Next, the duplex mode is determined, at block 204. By way of example, endpoint devices 102, 104 may be communicating with each other in full-duplex mode across a voice communication channel (e.g. in a VTG). Thus, the controller 152 determines that the two endpoints 102, 104 are engaged in a full-duplex mode. In this example embodiment, the parameter 158 associated with full-duplex mode may, for example, be a jitter buffer size of 100 ms. The static jitter buffer size may be defined beforehand by a network administrator based on operational requirements. In another example implementation, the system 100 may come with a default number which can be configured within pre-determined limits by the system administrator. The controller 152 then adjusts, at block 206, the jitter buffer size to 100 ms, in accordance with its associated parameter 158. The changes in jitter buffer size or mode may be controlled by the same control mechanism that toggles the endpoint (PMC) 107 between half- and full-duplex modes, the controller 152 in such a case forming part of the IPICS server 110.

The incoming voice stream from endpoint device 104 is then buffered in the jitter buffer, at block 222, by endpoint device 102 in accordance with the adjusted jitter buffer size of 100 ms. It is to be understood that other endpoints such as endpoint device 104 may include a similar controller 152 and jitter buffer 156.

From time-to-time it may be desirable to switch, at block 224, between duplex modes based on the particular configurations of the endpoints devices of various users. For the sake of illustration, a user of the endpoint device 106 may wish to join the VTG to communicate with the users of the other endpoint devices 102, 104. However, the endpoint device 106 may only be compatible with half-duplex mode, the endpoint device 106 for example being a PTT radio or telephone. Thus, either automatically or manually, the VTG is changed to half-duplex mode so that all the endpoint devices 102 to 107 may communicate with one another in half-duplex mode.

The duplex mode is accordingly determined, at block 204, by the controller 152 to be half-duplex mode. For example, the parameter 158 associated with half duplex mode may be a jitter buffer size of 300 ms. The controller 152 thus automatically assigns to the jitter buffer 156 a size of 300 ms. As long as the communication system or channel is active, at block 226, the method 220 may repeat by buffering further voice communication in accordance with the buffer parameters 158 and adjusting the jitter buffer 156 in accordance with the duplex mode. Therefore, the example embodiment provides a jitter buffer 156 which may make it possible for a voice communication system, e.g. VoIP PTT system, to switch efficiently between full-duplex operation with shorter one-way delays allowable and half-duplex operation with longer one-way delays allowable. The adjustment of the jitter buffer 156 in accordance with an example embodiment is distinguishable from adaptive algorithms in that the adjustment is instantaneous or at least relatively quick and is based on predetermined parameters or criteria, whereas adaptive algorithms adapt the jitter buffer based on incoming packets statistics and are thus relatively gradual, displaying noticeable lag.

By way of further example, another instance in which the duplex mode may change between half- and full-duplex mode may be when PTT voice communication services can use a combination of half-duplex and full-duplex signals to operate. For instance, the action of pressing a PTT button applies a control tone or floor control mechanism to the telecommunications network 108. The primary mode of PTT communication is half-duplex. If a user pushes the PTT button, the user can send but can not receive, whereas if the PTT button is not pressed, the user can receive but can not send. This type of communication (half-duplex), along with either audible signals or a specific protocol, tolerates very large one-way delays without serious voice quality degradation. This makes conference-type communication between large numbers of users possible without excessive interruption.

To make the hand-off of the right to speak for this type of PTT communication efficient, it is often desirable to have full-duplex communication during the hand-off between multiple users. With full-duplex operation, users are able to hear other speakers talking simultaneously or they may hear a control signal, indicating floor control status. During full-duplex operation, it may be necessary to minimize the one-way delay to enhance the operation of an echo canceling algorithm and to and avert collisions between users.

Referring now to FIG. 5, a low-level flow diagram of a method 250 in accordance with an example embodiment is shown. The method 250 may be utilized by a particular application for controlling a dynamically adaptive jitter buffer. Like numerals to refer to like parts in, on the one hand, FIGS. 3 and 4, and, on the other hand, FIG. 5, unless otherwise indicated.

Blocks 202 to 206 may correspond to those of the methods 200, 220. However, because method 250 additionally uses an adaptive algorithm, the buffer parameters 158 define a range of values, rather than a single value. For example, the half-duplex mode may be associated with a range from 150 ms to 300 ms, while their full-duplex mode may be associated with a range from 50 ms to 150 ms. In this example method 250, endpoint devices 102, 104 as well as endpoint device (PMC) 107 are again communicating with each other in the full duplex mode. Thus, the controller 152 adjusts the jitter buffer 156 to a variable size of between 50 ms and 150 ms. An instantaneous size of the jitter buffer 156 may depend on usage statistics (further described below).

In the first iteration of the method 250, the adaptive algorithm will not yet have been applied, so the jitter buffer 156 may be set to an initial size in the full-duplex range, for example a size of 100 ms, at block 252. The incoming voice communication is then buffered, at block 222. In accordance with this example embodiment, an adaptive algorithm is applied by the controller 152, at block 256, based on received packets statistics, for example, jitter or delay between successive packets. For instance, if the number of available voice packets in the jitter buffer is depleted down to two packets, the size of the jitter buffer 156 may need to be increased. Any convenient adaptive algorithm may be applied. Regardless of the particular adaptive algorithm used, the size of the jitter buffer may be adjusted and established techniques may be used to increase the number of voice packets in the jitter buffer, at block 256, by the controller 156 in accordance with the adaptive algorithm.

Again, from time to time, the operations mode may change, at block 224. At this stage, adjustable parameters as determined by the adaptive algorithm are temporarily stored, at block 258, for example on the memory module 154. The jitter buffer 156 is then adjusted in accordance with the new duplex mode, for example being set to the half-duplex range of between 150 ms and 300 ms. If the communication channel (e.g., VTG) had previously carried half-duplex communications, adapted parameters for half duplex communication would have been stored. Thus, the jitter buffer 156 can start being adapted immediately using adapted parameters (e.g. a jitter buffer size of 275 ms) determined from the previous half-duplex communication. Naturally, the adaptive algorithm may adapt the jitter buffer 156 between the bounds based on the half-duplex current communication. However, it is to be appreciated that the previous adapted parameters can be applied to the jitter buffer 156 instantaneously without the need to monitor incoming packets, which may otherwise cause further adaptations to be relatively slow.

Instead, if desired, the adapted parameters need not be stored but can merely be discarded, the controller 152 in such a case may set the jitter buffer 156 to a default value, for example the middle of the range associated with a particular duplex mode.

Figure 6:
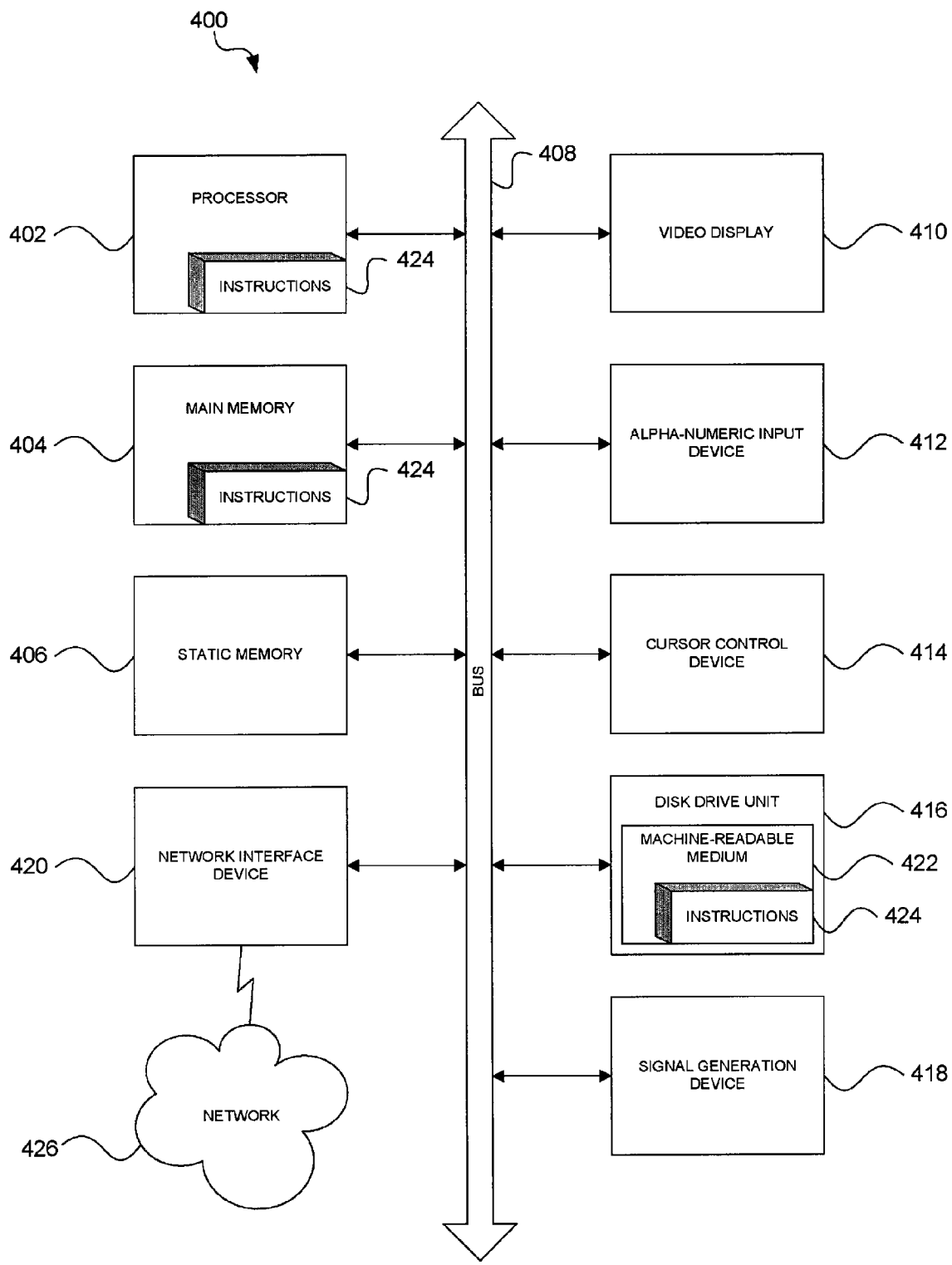
FIG. 6 shows a diagrammatic representation of a machine in the example form of a computer system within which a set of instructions, for causing the machine to perform any one or more of the methodologies discussed herein, may be executed.

FIG. 6 shows a diagrammatic representation of machine in the example form of a computer system 400 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) a digital signal processor (DSP), or any combination of these processors), a main memory 404 and a static memory 406, which communicate with each other via a bus 408. The computer system 400 may further include a video display unit 410 (e.g., a liquid crystal display (LCD), a plasma display or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., FTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present embodiments, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Any one or more of endpoints 102 to 107 and/or IPICS server 110 may be in the form of the computer system 400.

The example embodiments as above described may find particular application with PMCs which can operate in either half- or full-duplex mode, with particular applicability in PTT-based communications.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

The invention claimed is:

1. A method for controlling a size of a jitter buffer, the method comprising:
   during a first iteration performing, using one or more processors, operations comprising:
   determining a first duplex mode of operation of a first network device using a communication channel to communicate with a second network device, the first duplex mode being a half-duplex mode or a full-duplex mode;
   in response to the first duplex mode determined to be the half-duplex mode, performing a first set of operations comprising:
   buffering packets associated with an incoming media stream,
   applying an adaptive algorithm to the jitter buffer, wherein the adaptive algorithm dynamically adjusts the jitter buffer to a first size within a first range of sizes having a first lower bound and a first upper bound,
   determining whether the first duplex mode changed to the full-duplex mode,
   in response to the determining that the first duplex mode changed to the full-duplex mode, storing the first size of the jitter buffer and proceeding to a second iteration,
   in response to the determining that the first duplex mode is not changed, continuing the buffering of the packets and the applying of the adaptive algorithm of the first set of operations;
   in response to the first duplex mode determined to be the full-duplex mode, performing a second set of operations comprising:
   buffering packets associated with the incoming media stream, applying the adaptive algorithm to the jitter buffer, wherein the adaptive algorithm dynamically adjusts the jitter buffer to a second size within a second range of sizes having a second lower bound and a second upper bound, determining whether the first duplex mode changed to the half-duplex mode, in response to the determining that the first duplex mode changed to the half-duplex mode, storing the second size of the jitter buffer and proceeding to the second iteration, in response to the determining that the first duplex mode is not changed, continuing the buffering of the packets and the applying of the adaptive algorithm of the second set of operations; and during the second iteration performing, using the one or more processors, operations comprising:

determining a second duplex mode of operation of the first network device using the communication channel to communicate with the second network device, the second duplex mode being the half-duplex mode or the full-duplex mode, in response to the second duplex mode determined to be the half-duplex mode, if the first size of the jitter buffer is stored, immediately adapting the jitter buffer to the first size before dynamically adjusting the jitter buffer, if the first size of the jitter buffer is not stored, performing the first set of operations, in response to the second duplex mode determined to be the full-duplex mode, if the second size of the jitter buffer is stored, immediately adapting the jitter buffer to the second size before dynamically adjusting the jitter buffer, if the second size of the jitter buffer is not stored, performing the second set of operations.

2. The method as claimed in claim 1, further comprising changing between the half-duplex mode and the full-duplex mode in real time.

3. The method as claimed in claim 1, wherein the jitter buffer is included in the first network device.

4. The method as claimed in claim 1, wherein the first size associated with the half-duplex mode is larger than the second size associated with the full-duplex mode.

5. The method as claimed in claim 1, wherein the applying of the adaptive algorithm to the jitter buffer comprises dynamically adjusting the jitter buffer based on packet arrival statistics.

6. The method as claimed in claim 1, wherein the immediately adapting of the jitter buffer comprises adapting discontinuously a size of the jitter buffer based on a change in duplex mode.

7. The method as claimed in claim 1, wherein the communication channel is a Push-To-Talk (PTT) communication channel.

8. A network device comprising:

a jitter buffer to counter jitter in a communication channel connecting the network device to another network device; and a controller, during a first iteration, configured to:

determine a first duplex mode of operation of a first network device using a communication channel to communicate with a second network device, the first duplex mode being a half-duplex mode or a full-duplex mode;

in response to the first duplex mode determined to be the half-duplex mode, perform a first set of operations wherein the controller is further configured to:

buffer packets associated with an incoming media stream, apply an adaptive algorithm to the jitter buffer, wherein the adaptive algorithm dynamically adjusts the jitter buffer to a first size within a first range of sizes having a first lower bound and a first upper bound, determine whether the first duplex mode changed to the full-duplex mode, in response to the determination that the first duplex mode changed to the full-duplex mode, store the first size of the jitter buffer and proceed to a second iteration, in response to the determination that the first duplex mode is not changed, continue to buffer the packets and apply the adaptive algorithm of the first set of operations;

in response to the first duplex mode determined to be the full-duplex mode, perform a second set of operations wherein the controller is further configured to:

buffer packets associated with the incoming media stream, apply the adaptive algorithm to the jitter buffer, wherein the adaptive algorithm dynamically adjusts the jitter buffer to a second size within a second range of sizes having a second lower bound and a second upper bound, determine whether the first duplex mode changed to the half-duplex mode, in response to the determination that the first duplex mode changed to the half-duplex mode, store the second size of the jitter buffer and proceed to the second iteration, in response to the determination that the first duplex mode is not changed, continue to buffer the packets and apply the adaptive algorithm of the second set of operations; and wherein the controller, during a second iteration, configured to:

determine a second duplex mode of operation of the network device, the second duplex mode being the half-duplex mode or the full-duplex mode, during the second iteration performing, using the one or more processors, operations comprising:

in response to the second duplex mode determined to be the half-duplex mode, if the first size of the jitter buffer is stored, immediately adapt the jitter buffer to the first size before dynamically adjusting the jitter buffer, if the first size of the jitter buffer is not stored, perform the first set of operations, in response to the second duplex mode determined to be the full-duplex mode, if the second size of the jitter buffer is stored, immediately adapt the jitter buffer to the second size before dynamically adjusting the jitter buffer, if the second size of the jitter buffer is not stored, perform the second set of operations.

9. The network device as claimed in claim 8, wherein the controller changes parameters of the jitter buffer on-the-fly in accordance with the half-duplex mode and the full-duplex mode.

10. The network device as claimed in claim 8, wherein the first size associated with the half-duplex mode is larger than the second size associated with the full-duplex mode.

11. The network device as claimed in claim 8, wherein the controller is configured to apply the adaptive algorithm to the jitter buffer based on packet arrival statistics.

12. The network device as claimed in claim 8, wherein the network device comprises a communication endpoint device.

13. An apparatus comprising:
a processor comprising:
a controller, during a first iteration, configured to:
determine a first duplex mode of operation of a first network device using a communication channel to communicate with a second network device, the first duplex mode being a half-duplex mode or a full-duplex mode;
in response to the first duplex mode determined to be the half-duplex mode, perform a first set of operations wherein the controller is further configured to:
buffer packets associated with an incoming media stream,
apply an adaptive algorithm to the jitter buffer, wherein the adaptive algorithm dynamically adjusts the jitter buffer to a first size within a first range of sizes having a first lower bound and a first upper bound,
determine whether the first duplex mode changed to the full-duplex mode,
in response to the determination that the first duplex mode changed to the full-duplex mode, store the first size of the jitter buffer and proceed to a second iteration,
in response to the determination that the first duplex mode is not changed, continue to buffer the packets and apply the adaptive algorithm of the first set of operations;
in response to the first duplex mode determined to be the full-duplex mode, perform a second set of operations wherein the controller is further configured to:
buffer packets associated with the incoming media stream,
apply the adaptive algorithm to the jitter buffer, wherein the adaptive algorithm dynamically adjusts the jitter buffer to a second size within a second range of sizes having a second lower bound and a second upper bound,
determine whether the first duplex mode changed to the half-duplex mode, in response to the determination that the first duplex mode changed to the half-duplex mode, store the second size of the jitter buffer and proceed to the second iteration,
in response to the determination that the first duplex mode is not changed, continue to buffer the packets and apply the adaptive algorithm of the second set of operations; and wherein the controller, during a second iteration, configured to:
determine a second duplex mode of operation of the network device, the second duplex mode being the half-duplex mode or the full-duplex mode, during the second iteration performing, using the one or more processors, operations comprising:
in response to the second duplex mode determined to be the half-duplex mode,
if the first size of the jitter buffer is stored, immediately adapt the jitter buffer to the first size before dynamically adjusting the jitter buffer,
if the first size of the jitter buffer is not stored, perform the first set of operations,
in response to the second duplex mode determined to be the full-duplex mode,
if the second size of the jitter buffer is stored, immediately adapt the jitter buffer to the second size before dynamically adjusting the jitter buffer,
if the second size of the jitter buffer is not stored, perform the second set of operations.

14. The method as claimed in claim 1, wherein the first range of sizes associated with the half-duplex mode is mutually exclusive with the second range of sizes associated with the full-duplex mode.

15. The network device as claimed in claim 8, wherein the first range of sizes associated with the half-duplex mode is mutually exclusive with the second range of sizes associated with the full-duplex mode.

16. The method as claimed in claim 1, wherein the applying of the adaptive algorithm to the jitter buffer comprises gradually adjusting the first or second size of the jitter buffer in response to actual packet traffic.

* * * * *